B. LOOMIS.
APPARATUS FOR TREATING AND DISTILLING WOOD.
APPLICATION FILED MAR. 22, 1912.
1,148,104.
Patented July 27, 1915.
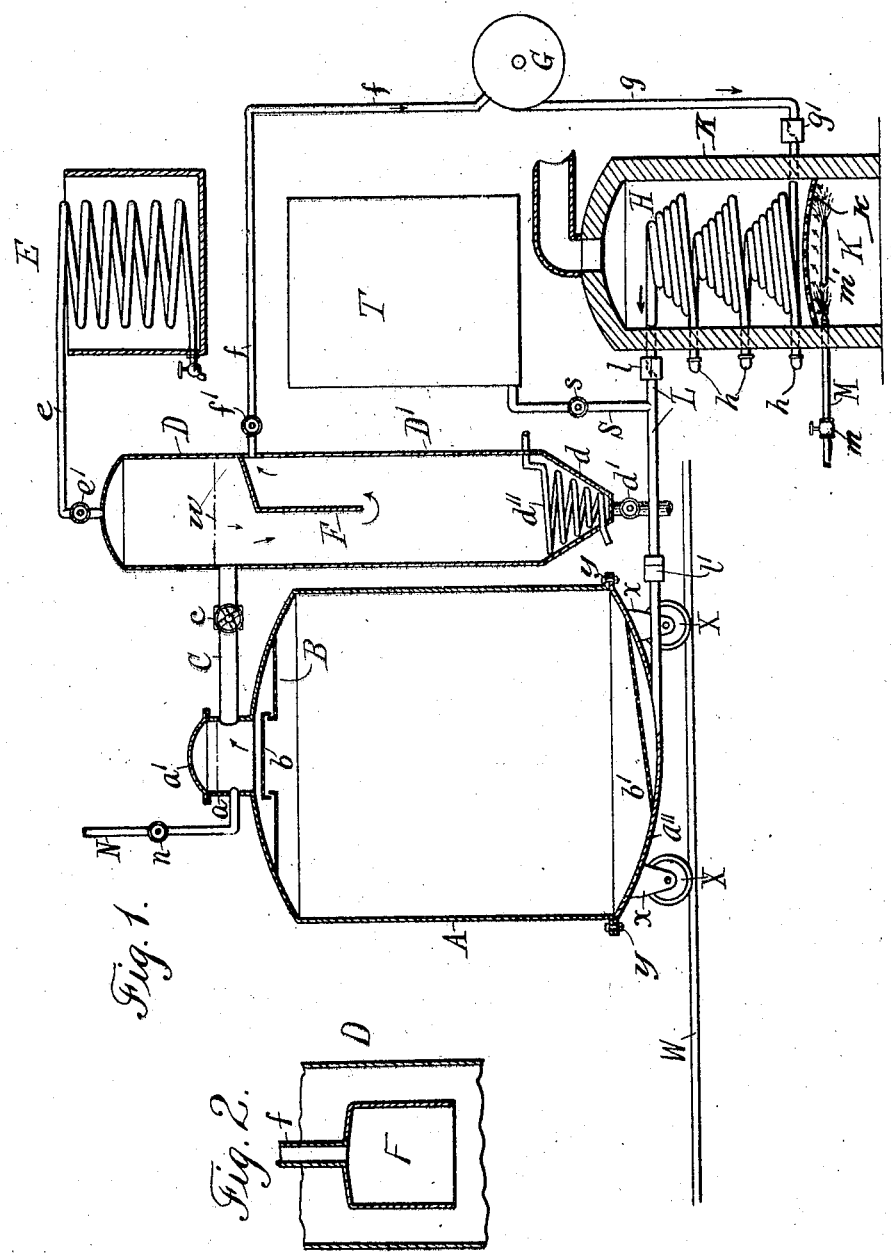
WITNESSES
INVENTOR
Burdett Loomis
By E. B. Clark
Attorney

UNITED STATES PATENT OFFICE.

BURDETT LOOMIS, OF HARTFORD, CONNECTICUT, ASSIGNOR TO LOOMIS UTILIZATION COMPANY, OF EAST ORANGE, NEW JERSEY, A CORPORATION OF NEW JERSEY.

APPARATUS FOR TREATING AND DISTILLING WOOD.

1,148,104.     Specification of Letters Patent.     Patented July 27, 1915.

Application filed March 22, 1912. Serial No. 685,646.

*To all whom it may concern:*

Be it known that I, BURDETT LOOMIS, a citizen of the United States, residing at Hartford, in the county of Hartford and State of Connecticut, have invented certain new and useful Improvements in Apparatus for Treating and Distilling Wood, of which the following is a specification.

This invention relates to apparatus for treating and distilling wood to obtain turpentine, oils, rosin, lignin and other products adapted for economic use in the industrial arts.

The principal object of my invention is to provide, in an apparatus, means for circulating hot water or a solvent liquor in contact with comminuted or chipped wood for dissolving gummy matter and releasing turpentine, oils and rosin from the cellular structure; at the same time agitating the material and carrying away the extracted constituents and recovering the same by distillation and condensation and by causing separation and deposit of the heavier resinous matter in a separate chamber.

Another object is to provide means for positively circulating hot water or a solvent treating liquor up through wood chips for releasing and carrying away resinous matter and causing it to be separated from the liquor and deposited in a catch-all or depositing chamber, so that such resinous matter shall not settle in the wood-treating chamber or tank.

Another object is to provide means for positively circulating a solvent treating liquor through a body of wood chips in a treating tank for releasing and extracting products, thence through a separating and depositing chamber for resinous matter, thence through a heater for maintaining and increasing the temperature and thence back into, and through, the treating tank, repeatedly or continuously, till the constituents have been recovered and the lignin is left practically free for use in making cellulose or other purpose.

A special object is to provide means for separating and causing the deposit of resinous matter from a circulating extracting liquor.

Another special object is to provide means for reheating a circulating extracting liquor between a separating and depositing chamber and a wood treating tank, so that the temperature of the liquor may be maintained or increased as desired for most effective use in the extracting operation.

By heating wood to a moderate temperature, ranging between 215° and 245° F., decomposition is set up, resulting in the formation of a number of acids of the fatty acid series, and by raising the temperature there are formed other fatty acids. The formation of fatty acids, among which acetic acid appears in largest quantity, commences, according to Gillot, at 225° F. Other fatty acids are formed, such as formic acid, butyric acid, valeric acid, etc., at the above and higher temperatures. Simultaneously with the formation of these acids, carbonic acid, carbonic oxid and methane are evolved from the wood, and these bodies in a nascent state may act upon the acids so that the latter may undergo decomposition by more vigorous heating and a large number of products of decomposition may be formed. Among such products are found methyl alcohol (wood spirits) acetone and metacetone, methyl acetic ether, aldehyde and dimethyl acetal. I have discovered that these above mentioned fatty acids, gases and other products of decomposition, when diffused in hot water, are an excellent solvent for the cellular structure, the gummy and resinous materials found in wood and plants, and that, if the mixture or solution is circulated in contact with the wood to be treated the contained resinous matter, oils and turpentine will be quickly liberated and may be drawn off with circulating water. The turpentine and more volatile oil will pass off in the form of vapor and will be condensed, and the rosin will pass off in a melted semi-liquid condition and will be deposited and recovered. I have also discovered that the fatty acids and other solvents may be most effectively and economically produced, and diffused in water by first heating fresh water and circulating it in contact with the wood to be treated at gradually increasing temperatures, ranging from 212° to approximately 300° F. The volatile solvent is readily extracted from the wood and diffused in the water and the mixture is passed from the wood treating tank through a heater where the temperature is raised and is then circulated up through the wood. The circulation of the water and solvent in contact with the wood and through the heater, the temperature being gradually increased, is continued till the solvent has liberated the turpentine, oil and rosin and these valuable products have been recovered. The treatment may be continued for six to twelve hours, according to the character of the wood and the temperature of the treating liquor. I have therefore devised apparatus suitable for carrying out the process and obtaining the above indicated advantageous results.

The matter constituting my invention will be defined in the claims.

I will now describe my apparatus in detail by reference to the accompanying drawing, Figure 1 showing a sectional elevation thereof. Fig. 2 represents a modification of part of the separating chamber and its dome or hood.

In the apparatus I provide four principal parts or devices, consisting of a treating and distilling tank A, an expansion and depositing chamber D, D′, heating coils H located in a furnace below the bottom of tank A, and a condenser E, these parts being suitably connected by valved pipes and a circulating pump being used in the connecting pipes.

The tank A may be constructed of boiler iron or other suitable sheet metal, and has at the top a mouthpiece $a$ provided with a cover $a'$, and at the bottom a removable cover plate $a''$ which is removed for discharging treated chips. At the top of the tank below the mouthpiece is secured a transverse perforated screen plate B, in the middle portion of which is provided an opening and a sliding or removable perforated plate $b$. The plates B and $b$ may be made of perforated sheet metal or strong wire cloth. To the bottom cover is secured a perforated screen $b'$ over the opening for the return circulating pipe L. The bottom cover is made removable, and will, in practice, be secured to the tank by bolts $y$. It is preferably mounted by lugs $x$ on wheels X on rails W for convenient removal when the bolts are withdrawn. To the mouthpiece $a$ is connected a water and vapor discharge pipe C, having a valve $c$, which connects with an expansion and depositing chamber D, D′, at the top of which connects the turpentine discharge pipe $e$, having a valve $e'$. The pipe $e$ leads to a condenser E.

The expansion and depositing chamber D, D′ is preferably of greater height than the treating tank and rises above the same and is about one-half the diameter of said tank, though such exact proportions are not required. At the lower end the chamber is made with tapering walls $d$, $d$, terminating with a discharge pipe having a valve $d'$ for drawing off rosin. A steam coil $d''$ is placed in the lower end of the depositing or catch-all chamber D′ for melting resinous material in case it becomes cold and hardened. At about middle height of chamber D, D′ is placed a separating dome or hood F, which may be attached at its edges to the wall of the chamber, as shown in Fig. 1, or may be detached with free edges all around as shown in Fig. 2. In this construction the dome is suspended centrally in chamber D′ and has connecting with the top a water outlet pipe $f$. In the construction shown in Fig. 1, the outlet pipe $f$ connects with the wall of chamber D′ below the top of the dome and is provided with a valve $f'$. The dome F is located below the connection of the water and vapor discharge pipe C from treating tank A and provides a vapor expansion chamber or space D above it, and a rosin depositing or catch-all chamber or space D′ below it. This dome acts as a deflector and separator to cause the rosin to be deposited in the bottom of chamber D′ while the water or treating liquor flows up into the dome and thence off to the circulating pump G. A positively acting rotary pressure pump is preferably used, though some other kind of positive pressure pump may be employed. A discharge pipe $g$ connects with the pump and leads to the lower end of a series of heating coils H suitably supported in a furnace K. These coils are connected in a series by means of return bend couplers $h$ which extend through the wall of the furnace. Near the bottom of the furnace is provided a perforated arch $k$ for distributing the gas flame and protecting the lower heating coil. A fire chamber is provided below the arch $k$. Gas is preferably burned in the fire chamber and is supplied by a pipe M having a valve $m$ and a burner of any suitable kind $m'$ in the fire chamber.

In order to secure satisfactory heating and circulation of liquid through the apparatus, the heater is located so that the top thereof is below the bottom of the treating and distilling tank A.

To the top of the heating coil is connected a return pipe L of the circulating system, and this pipe is also connected to the bottom cover $a''$ of the treating tank A. A union coupling $l'$ is preferably used in pipe L so that the cover $a''$ may be readily removed for discharging the contents of tank A. The return pipe L is provided with a check valve $l$. A check valve $g'$ is also placed in the lower end of pipe $g$ at its connection with the coil. These check valves prevent back flow of water from the tank. To pipe L is connected a blow-off pipe S, having a valve $s$, and connecting with a storage and settling tank T. A water supply pipe N, having a valve $n$, connects with the mouthpiece of tank A, or may connect at other desired part of the apparatus, as near the heating coils.

In operating the apparatus for carrying out my process, the bottom cover $a''$ is closed and secured by bolts, and the tank is then filled with chips of wood through the mouthpiece $a$, the sliding screen $b$ being at that time open. The chips are preferably made by cutting the wood across the grain, and may be about an inch thick. The tank A is preferably filled with chips up to the screen B, and then the sliding screen $b$ and the top cover $a'$ are closed and secured in place.

Now the whole system, including tank A, chamber D, D' and the coils, is filled with water admitted by pipe N and caused to rise to the dotted line $w$ just above the level of the discharge pipe C. Gas is then admitted to the burner $m'$ and lighted, and the circulating pump G is started. This causes the circulation of water through the heating coils and thence up through the treating and distilling tank A in contact with the wood chips. As the circulating water becomes heated, approximately to 212° F., some of the fatty acids are produced and pass with the water into the heating coils. As the temperature of the water is gradually raised, other fatty acids, gases and products of decomposition are formed and diffused through the water. The hot circulating water and the solvent fatty acids soon commence to dissolve the cellular structure and release the turpentine and volatile oil from the wood chips. The turpentine and oil vapor pass with the water or liquor into chamber D, D', where the volatile vapors separate and fill the vapor space D from which they pass off through pipe $e$ to the condenser E, where condensation is effected. At the same time the circulating water containing rosin which has been released from the wood is passed down over the separating dome F where the rosin is separated and caused to settle into the rosin depositing or catching chamber D', where it collects while the water passes up through the separator dome F, and thence by pipe $f$, the circulating pump G, and pipe $g$ into the bottom of the heating coils. By circulating the hot water up through the chips in tank A, the rosin is carried upward and floated off with the water through pipe C into chamber D, D', where it is deposited.

The circulating hot water or solvent liquor in tank A agitates the body of chips and prevents packing, and continuously carries away the extracted material so as to continuously bring fresh liquor into contact with the chips to effectively exert its solvent action on the cellular structure thereof and release the gummy and resinous constituents.

In the expansion and depositing chamber D, D', the turpentine and oil vapor readily separates from the liquor, and at the same time the liquor is partially cooled so that the rosin is hardened and will readily settle in the bottom of chamber D'. The velocity of the flow of liquor is much retarded in the expansion and depositing chamber, thereby facilitating the deposit of rosin. This action is also aided by the small overflow outlet pipe $f$ from the top of the separating dome F. The temperature in chamber D', owing to the fact that it is an expansion chamber, and is not heated during process, will be considerably lower than that in the treating chamber B, so as to facilitate the hardening and deposit of rosin, but no fixed temperature can be given as it will vary in accordance with the outside temperature and the temperature maintained in tank B.

The temperature of the water or liquor may be gradually raised in the heating coils to approximately 300° F. As the operation progresses, the water or liquor becomes charged with an increasing percentage of fatty acids, gases, etc., and these act with increasing energy to dissolve, release, and extract the turpentine, oil and rosin from the wood chips till they are substantially free from such constituents. The operation may be continued for a period varying from six to twelve hours, according to the character of wood being treated. At suitable intervals, the valve $d'$ may be opened and the rosin discharged from the chamber D', but this may be mostly discharged at the end of the operation.

When the treatment and distillation of the wood in tank A is completed, the valve $c$ may be closed and the blow-off valve $s$ opened, permitting the water or liquor containing the fatty acid to be blown off into the storage and settling tank T, where it is reserved for treating a succeeding charge of wood-chips in tank A. The water having been drawn off, the bottom cover $a''$ of tank A may be removed, and the chips discharged by gravity into a suitable receptacle. The chips being freed from turpentine, oil and rosin will be in condition for making cellulose and various other uses in the industrial arts. The spent wood-chips may also be used as fuel in the furnace for heating the coils.

The process herein described is made the subject of a separate application, Serial No. 685,647, filed March 22, 1912, and, therefore, is not herein claimed.

Having described my invention, what I claim and desire to secure by Letters Patent is:

1. The combination with a wood-treating and distilling tank, of means for supplying hot water or liquor thereto, a discharge pipe for vapor and water connecting with the top of the tank, a closed expansion and depositing chamber connecting with said pipe and having a separating hood or dome approximately at its middle portion an outlet pipe for liquor connecting with the top thereof and a vapor outlet pipe at the top of the expansion chamber.

2. The combination with a wood-treating and distilling tank, of means for heating water or liquor and supplying it to the bottom of the tank, a closed expansion and depositing chamber having a vapor space at the top and a depositing space at the bottom and a separating hood or dome between the top and bottom, an outlet pipe for liquor connecting with the top of the dome, a vapor escape pipe connecting with the expansion chamber above the dome and a discharge pipe for vapor and water connecting the top of the treating tank with the expansion chamber.

3. The combination with a wood-treating and distilling tank, of a closed expansion and depositing chamber connecting with the top of said tank, a closed rosin separating hood or dome below the top of said chamber and providing a vapor space above and a rosin depositing space below, a vapor escape pipe leading from the vapor space, an outlet pipe for liquor connecting with the top of the dome, a liquid forcing and circulating device, a heater and pipe connections between the dome and forcing device and between the heater and the bottom of the treating and distilling tank.

4. The combination with a wood treating and distilling tank, of a closed expansion and depositing chamber, a water and vapor discharge pipe connecting the top of the tank with said chamber, a condenser and a pipe connecting it with the top of the expansion chamber, a forcing and circulating pump, a water heater, pipes connecting the pump with the expansion and depositing chamber and with the heater, and a return pipe connecting the heater with the bottom of the treating and distilling tank.

5. In apparatus for treating and distilling wood, an expansion and depositing chamber having a separating hood approximately at its middle portion for providing a vapor space above and a rosin depositing space below, a water and vapor inlet pipe connecting above the hood and a water outlet pipe connecting below the hood, whereby the hood will act as a deflector for causing deposit of heavier matter in the bottom of the chamber.

6. The combination with a wood treating and distilling tank, of a closed expansion and depositing chamber connecting with the top thereof, a separating hood placed midway in said chamber causing deposit of heavy resinous matter from liquor, a forcing and circulating pump connecting with such chamber near the top of the hood, a coil heater, a pipe connecting the pump with the bottom thereof, and a pipe connection from the top of the heater to the bottom of the treating tank for heating liquor and forcing it up through material under treatment in the tank.

7. A treating and distilling tank having a mouthpiece and a cover at the top, a perforated screen plate below the same, a removable bottom cover and screen, and a discharge pipe for liquor and vapor connecting with the mouthpiece, in combination with an expansion and depositing chamber having a separating hood or dome approximately at its middle portion for providing a vapor space above and a rosin depositing space below, a circulating pump and a heater and pipe connections therefor from the top of the dome to the bottom of the treating tank below the bottom screen plate.

In testimony whereof I affix my signature in presence of two witnesses.

BURDETT LOOMIS.

Witnesses:
  E. B. CLARK,
  BENNETT S. JONES.

Copies of this patent may be obtained for five cents each, by addressing the "Commissioner of Patents, Washington, D. C."